(12) United States Patent
Luo et al.

(10) Patent No.: US 9,171,477 B2
(45) Date of Patent: Oct. 27, 2015

(54) METHOD AND SYSTEM FOR RECOGNIZING AND ASSESSING SURGICAL PROCEDURES FROM VIDEO

(71) Applicant: University of Rochester, Rochester, NY (US)

(72) Inventors: Jiebo Luo, Pittsford, NY (US); Junhuan Zhu, Rochester, NY (US); Yousuf Mohamed Khalifa, Rochester, NY (US)

(73) Assignee: UNIVERSITY OF ROCHESTER, Rochester, NY (US)

( * ) Notice: Subject to any disclaimer, the term of this patent is extended or adjusted under 35 U.S.C. 154(b) by 85 days.

(21) Appl. No.: 14/223,679

(22) Filed: Mar. 24, 2014

(65) Prior Publication Data
US 2014/0286533 A1    Sep. 25, 2014

Related U.S. Application Data

(60) Provisional application No. 61/804,947, filed on Mar. 25, 2013.

(51) Int. Cl.
| | |
|---|---|
| *G06K 9/00* | (2006.01) |
| *G09B 5/00* | (2006.01) |
| *G06K 9/62* | (2006.01) |
| *G09B 19/00* | (2006.01) |

(52) U.S. Cl.
CPC .............. *G09B 5/00* (2013.01); *G06K 9/00597* (2013.01); *G06K 9/6297* (2013.01); *G06K 2209/057* (2013.01)

(58) Field of Classification Search
USPC ......... 382/100, 103, 106–107, 128–134, 155, 382/162, 168, 173, 181, 209, 224, 232, 254, 382/274–276, 294, 305, 312; 378/4, 21; 600/554; 606/88; 434/262, 257; 706/12
See application file for complete search history.

(56) References Cited

U.S. PATENT DOCUMENTS

| | | | |
|---|---|---|---|
| 2007/0172803 A1* | 7/2007 | Hannaford et al. | ........... 434/262 |
| 2009/0299924 A1* | 12/2009 | Bauer et al. | ..................... 706/12 |
| 2011/0020779 A1* | 1/2011 | Hannaford et al. | ........... 434/262 |

(Continued)

OTHER PUBLICATIONS

Bhatia et al. Real-Time Identification of Operating Room State from Video. Journal, Proceedings of the 19th Innovative Applications of AI Conference.May 26, 2007.pp. 1761-1766.*

(Continued)

*Primary Examiner* — Seyed Azarian
(74) *Attorney, Agent, or Firm* — Patent Technologies, LLC; Robert D. Gunderman, Jr.

(57) ABSTRACT

A Method and System For Recognizing and Assessing Surgical Procedures from a video or series of still images is described. Evaluation of surgical techniques of residents learning skills in areas such as cataract surgery is an important aspect of the learning process. The use of videos has become common in such evaluations, but is a time consuming manual process. The present invention increases the efficiency and speed of the surgical technique evaluation process by identifying and saving only information that is relevant to the evaluation process. Using image processing techniques of the present invention, an anatomic structure of a surgical procedure is located on a video, timing of predefined surgical stages is determined, and measurements are taken from frames of the predefined surgical stages to allow the performance of a surgeon to be assessed in an automated and efficient manner.

18 Claims, 4 Drawing Sheets

(56) References Cited

U.S. PATENT DOCUMENTS

2014/0236159 A1* 8/2014 Haider et al. ............... 606/88
2014/0249446 A1* 9/2014 Gharib et al. ............... 600/554

OTHER PUBLICATIONS

Lalys et al. A framework for the recognition of high-level surgical tasks from video images for cataract surgeries. Journal. IEEE Trans Biomed Eng. Feb. 13, 2012 . . . pp. 966-976. 59 (4). IEEE. Country not specified.

Blum et al. Modeling and Segmentation of Surgical Workflow from Laparoscopic Video. Journal. May 25, 2010. pp. 1-8. Publisher and country not specified.

Bhatia et al. Real-Time Identification of Operating Room State from Video. Journal. Proceedings of the 19th Innovative Applications of AI Conference. May 26, 2007. pp. 1761-1766.

Ballard. Generalizing the Hough Transform to Detect Arbitrary Shapes. Journal. Pattern Recognition. Sep. 23, 1980. pp. 111-122. vol. 13, No. 2. Pergamon Press Ltd. GB.

Padoy et al. On-line Recognition of Surgical Activity for Monitoring in the Operating Room. Journal. Association for the Advancement of Artificial Intelligence. Mar. 26, 2008 . . . pp. 1-7. Publisher and country not specified.

Suzuki et al. Skill Evaluation from Observation of Discrete Hand Movements during Console Operation. Journal. Journal of Robotics. Feb. 15, 2010. pp. 1-13 . . . Hindawi Publishing Corporation. Country not specified.

Bertalmio et al. Image Inpainting. Journal. Apr. 12, 2000. pp. 1-8. Publisher and Country not specified.

Barron et al. Performance of Optical Flow Techniques. Journal. Nov. 28, 2003. pp. 1-60. Publisher and Country not specified.

Ahmidi et al. Surgical Task and Skill Classification from Eye Tracking and Tool Motion in Minimally Invasive Surgery. Journal. Aug. 5, 2010. pp. 295-302. MICCAI 2010 . . . Country not specified.

* cited by examiner

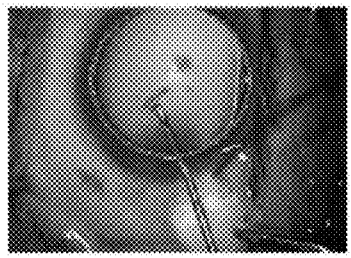 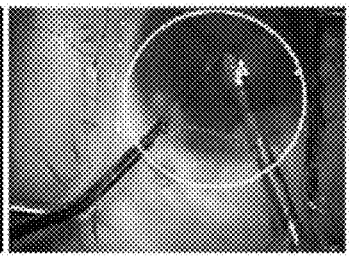 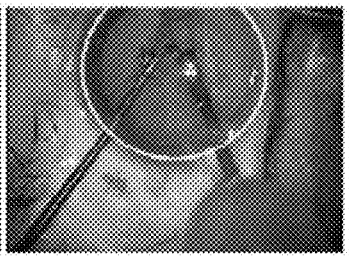
Fig. 3A  Fig. 3B  Fig. 3C
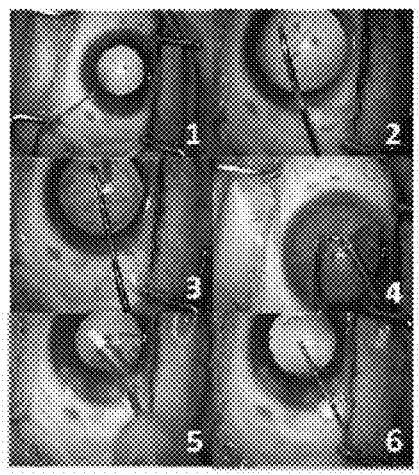 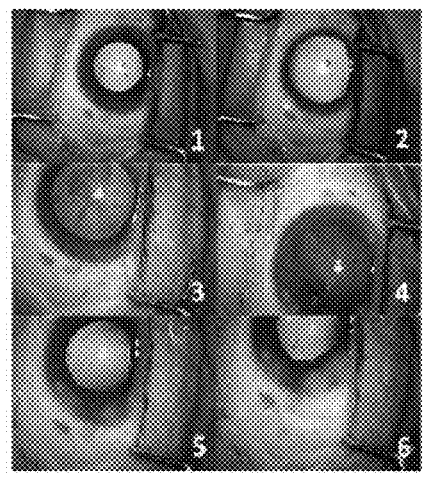
Fig. 4A  Fig. 4B

METHOD AND SYSTEM FOR RECOGNIZING AND ASSESSING SURGICAL PROCEDURES FROM VIDEO

This application claims priority to U.S. Patent Application Ser. No. 61/804,947 filed Mar. 25, 2013 entitled "Method And System For Automatically Assessing Surgeries From Video" by Yousuf Khalifa, Jiebo Luo, and Junhuan Zhu, the entire disclosure of which is incorporated herein by reference.

BACKGROUND OF THE INVENTION

1. Field of the Invention

The present invention relates generally to the field of digital image processing and, more particularly, to a method and system for recognizing and assessing surgical procedures depicted in a video.

2. Description of the Related Art

Cataract surgery is one of the more common surgical procedures involving the eye. It is important for ophthalmology residents to learn to perform cataract surgery proficiently. For classroom training purposes, the cataract surgery process is divided into several major stages, and a trained supervisor will assign each of these stages a numerical grade. To increase the efficiency of evaluating residents learning cataract surgical techniques, the use of videos has become common. While the use of videos is a comprehensive way to evaluate surgical techniques, the review and grading of these videos is a time consuming manual process. What is needed is a system and method to increase the efficiency and speed of the surgical technique evaluation process.

It is thus an object of the present invention to provide a computer based evaluation system for cataract surgical techniques. It is another object of the present invention to provide a computer based evaluation system for cataract surgery videos. It is another object of the present invention to provide a computer based evaluation system for cataract surgery that recognizes each of the surgical stages of cataract surgery. It is yet another object of the present invention to provide a computer based evaluation system for grading cataract surgical techniques.

These and other objects of the present invention are not to be considered comprehensive or exhaustive, but rather, exemplary of objects that may be ascertained after reading this specification with the accompanying claims and drawings.

BRIEF SUMMARY OF THE INVENTION

There is thus a need for a method and system for recognizing and assessing surgical procedures depicted in video in order to assess, or assist with the assessment of, the performance of surgeons or trainees.

In accordance with the various embodiments of the present invention, in one embodiment there is disclosed a method of analyzing a digital video which is captured by a camera where the video comprises a plurality of frames, to recognize and assess a surgical procedure that includes a plurality of predefined stages and actions performed by a surgeon. The various embodiments of the present invention provide an efficient and simplified automatic system for analyzing, for example, cataract surgery videos to identify in the video the various surgical stages used for evaluation and grading based on low-level visual features. In one embodiment of the present invention, a cataract surgery video used for evaluation and grading has six stages, which are defined in one embodiment as: 1) paracentisis port, 2) capsulorrhexis, 3) hydrodissection, 4) lens removal, 5) irrigation, and 6) lens insertion and closing. To recognize the various surgical stages, one embodiment of the present invention employs the following steps. First, the boundary of the pupil is detected, using a circular Hough transform, and the primary Region of Interest (ROI) is obtained from each frame that is analyzed. Next, the presence of surgical tools is detected through a linear Hough transform, and frames containing no surgical tools are discarded from further analysis because such frames would contain no discriminative information regarding these surgical stages. Then, GIST features are extracted from the Regions of Interest in the remaining frames, and two classification procedures are applied to obtain labels for each stage. In the next step, a six-state Hidden Markov Model is used to refine these stage recognition results. The outputs of this method of one embodiment of the present invention are temporally well-segmented sequences for further analysis.

Some various features and advantages of the present invention include using video recorded from a device such as a microscope, endoscope, or laparoscope to capture a surgery, performing computerized analysis of the surgery, in order to save time and manual assessment by experienced supervisors and provide objective assessment of surgery performance. The innovation can improve the efficiency of the current manual practice.

An automatic analysis system for cataract surgery videos is developed to further recognize surgical stages based on visual features. In particular, this system comprises three components: pupil detection, action frame detection and group/inner-group stage recognition. First, a robustified circular Hough transform and temporal estimation are applied to extract the pupil's circular boundary from each frame. Next, informative action frames with surgical tools present are selected through a linear Hough transform based on the distance between the pupil's center and the linear components detected by the Hough transform. Finally, the six surgical stages are merged into two groups, each of which has three temporally consecutive stages. For each frame, which group it belongs to is determined before determining its stage label using an Adaboost classifier, and then a Hidden Markov Model is used to refine the stage recognition results. To avoid overfitting, classification is performed via a bagging approach. Experimental results indicate that reliable stage recognition can be achieved with our proposed system, thus paving the foundation for further analysis.

The present invention provides an efficient automatic analysis system, which is convenient to reproduce, for surgical stage recognition on surgical videos such as those related to cataract surgery. The stage recognition is based on the classification of visual features from video frames. Three components are introduced: 1) pupil detection and Region of Interest definition, 2) action frame detection, and 3) stage recognition through group recognition, inner-group recognition and Hidden Markov Model based refinement. In a pupil detection procedure, morphological dilation and temporal estimation are used to extract the region of interest with high accuracy. In an action frame detection procedure, a linear Hough transform and filtering by the distance to the pupil's center are performed to identify the presence of surgical tools, and only action frames with surgical tools are retained for further analysis because the are more informative for stage recognition. In the stage recognition procedure, the video is segmented into two groups, and group recognition is applied first. Finally, the stages within the groups are recognized, followed by Hidden Markov Model based refinement to obtain the final results. Classification via the bagging method is applied to unbalanced training data to reduce overfitting in stage recognition.

The foregoing paragraph has been provided by way of introduction, and is not intended to limit the scope of the invention as described by this specification, claims and the attached drawings.

BRIEF DESCRIPTION OF THE DRAWINGS

The invention will be described by reference to the following drawings, in which like numerals refer to like elements, and in which:

FIGS. 3A-3C are still images showing examples of pupil detection in a preferred embodiment of the present invention;

FIG. 4A is a set of still images showing an illustration of a surgery video containing action frames of different surgical stages;

FIG. 4B is a set of still images showing an illustration of a surgery video containing downtime frames of different surgical stages;

Figure 1:
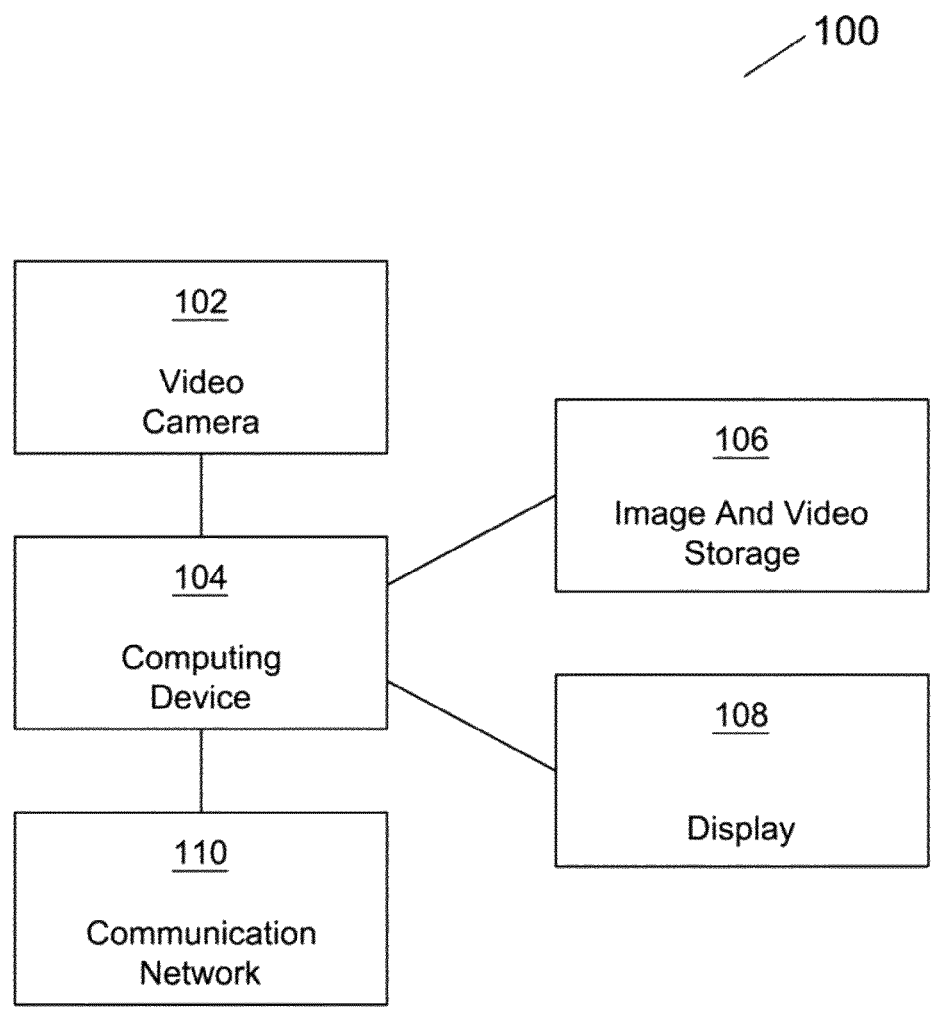
FIG. 1 is a block diagram illustrating a system that practices the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and drawings attached hereto.

DESCRIPTION OF THE PREFERRED EMBODIMENTS

A preferred embodiment will be set forth in detail with reference to the drawings, in which like reference numerals refer to like elements or steps throughout.

The method and system of the present invention may have various embodiments, some of which are described herein, and others of which may be inferred from or otherwise envisioned based on the disclosure contained herein. For example, the example used throughout this specification is that of cataract surgery and the recognition and assessment of surgical procedures used in cataract surgery. Upon review of the disclosure of the present invention set forth herein, one can envision and understand how the various embodiments of the present invention could be used for the recognition and assessment of other surgical techniques not necessarily related to cataract surgery in particular.

Figure 2:
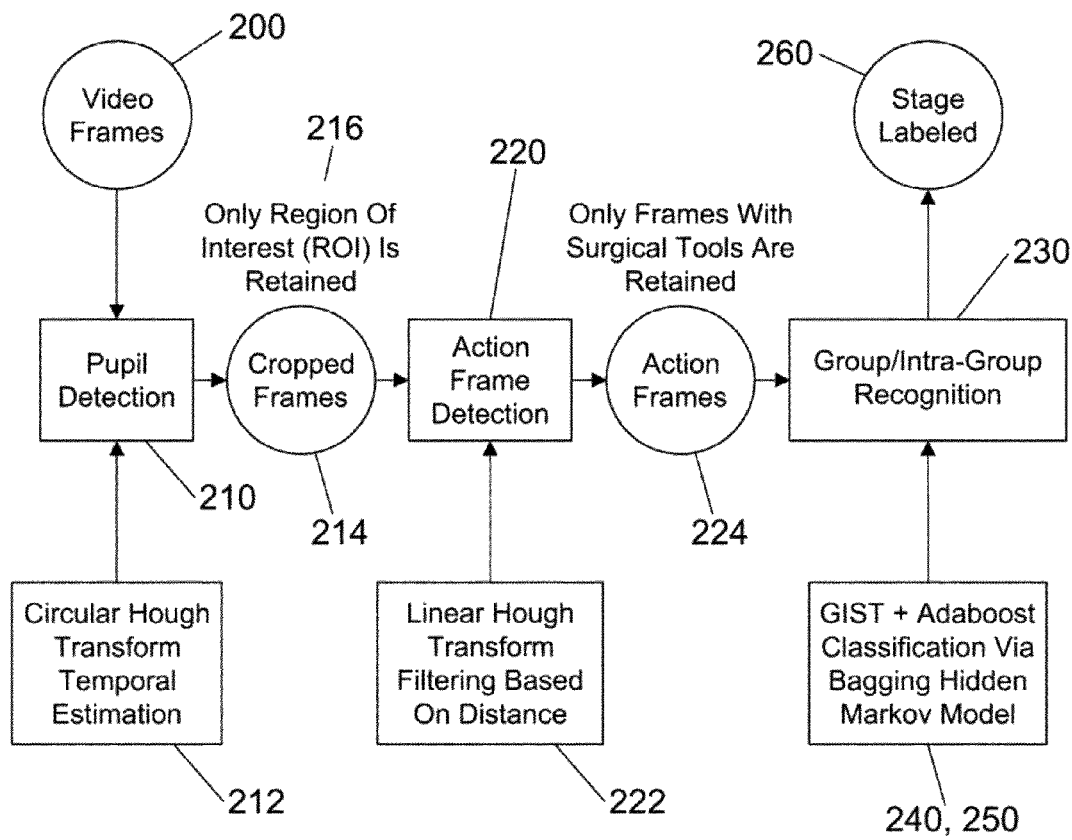
FIG. 2 is a flow chart illustrating the major steps of a method according to the present invention.
Figures 5A, 5B, 5C, 5D:
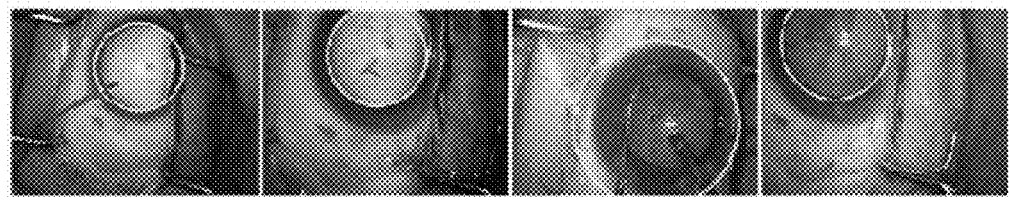
FIGS. 5A-5D are still images showing examples of surgical tool detection and action frame detection.

In FIG. 1, system 100 is shown with the elements necessary to practice the current invention including a video camera 102, a computing device 104, image and video storage 106, a display 108, and optionally a communication network 110. The video camera 102 can be a microscope, endoscope, or laparoscope camera or any other suitable camera. The computing device 104 can be a personal computer for processing and storing images where images will be understood to include both still and moving or video images. The computing device 104 communicates with a variety of devices such as a digital video camera 102 or image and video storage 106. The Processing of received video frames in accordance with the various embodiments of the present invention may be on the computing device 104 or another computing device or processor that is connected to the video camera 102, the computing device 104, or another element that is interconnected with the system of the present invention. Computing device 104 also communicates with the display 106 and optional communication network 110. In FIG. 2, a process diagram is illustrated showing the sequence of steps necessary to practice an embodiment of the present invention. The present invention represents an efficient automatic system for analyzing cataract surgery videos to identify the surgical stages based on low-level visual features. In general, a cataract surgery video comprises six stages: 1) paracentisis port, 2) capsulorrhexis, 3) hydrodissection, 4) lens removal, 5) irrigation, 6) lens insertion and closing, examples of which are shown in FIGS. 4A and 4B.

Continuing to refer to FIG. 2, there is shown a preferred embodiment of the present invention, depicting stage recognition for cataract surgery videos. To recognize the various surgical stages, in the video frames 200, the boundary of a pupil is first detected in step 210 using a circular Hough transform 212, and the frames are cropped in step 214 so that a primary Region of Interest (ROI) 216 is obtained from each frame. Next, the presence of surgical tools is detected in step 220 through a linear Hough transform 222 based on distance, and frames containing no surgical tools are discarded from further analysis because such frames would contain no discriminative information regarding the surgical stages. Thus, only frames 224 containing surgical tools are retained. GIST features (see Oliva, A. and Torralba, A. and others, "Building the gist of a scene: The role of global image features in recognition," Progress in brain research, vol. 155, pp. 23, 2006) are then extracted in step 230 from the remaining frames' Region of Interest 216, and two classification procedures, namely, GIST and Adaboost, are applied in step 240 to obtain stage labels. Finally, a six-state Hidden Markov Model (HMM) is used in step 250 to refine the stage recognition results 260.

The pupil detection of step 210 will be explained with reference to FIGS. 3A-3C. Those figures show results from the circular Hough transform, results from the temporal estimation, and the Region of Interest.

In real-time cataract surgery videos collected in the operating room, most operations are made in the region of the pupil and its surrounding areas, which is termed the Region of Interest (ROI). Because the region outside the ROI contains little useful information, extracting the Region of Interest from each frame will improve efficiency of the process of the present invention. The key to detecting the Region of Interest is finding the pupil circular boundary. One technique that is used in an embodiment of the present invention is the circular Hough transform, which is effective in many cases, such as in FIG. 3A. However, for some cataract surgery video frames, the pupil boundary may be distorted during the operation, resulting in failure to detect the correct circle, as shown in FIGS. 3B and 3C. To address that problem, an iterative search is performed to identify the most probable zone, but it cannot avoid missing pupil detection results such as the results depicted in FIG. 3C.

To overcome the problem of pupil boundary distortion during surgery and the related issue of failure to detect the correct circle, a preferred embodiment of the present invention first applies a morphological dilation operation on an edge map to deal with imperfect and thus undetectable boundaries, because this morphological dilation operation compensates for imperfections in circles to make the boundary more detectable by the circular Hough Transform. The combination of morphological dilation of the edge map and the circular Hough Transform is referred to in a preferred embodiment of the present invention as a robustified circular Hough Transform, which provides for lower overall complexity of the process of the present invention. Next, temporal information is used in both removing the incorrect detection results and estimating the pupil boundaries in frames where no circle is detected. Based on a sampling rate of 15 frames per second (fps), the pupil in this example does not change much in temporally consecutive frames. Thus, after applying the circular Hough transform, the boundaries having significant changes in the radius or center position compared with the average value of those in the six neighboring frames are removed. To deal with the problem of frames missing discernible pupil boundaries, those boundaries are estimated by taking the average radius and center position of their six neighboring frames. After the pupil is detected for each frame, the pupil's bounding box is enlarged two times in the direction where the surgeon stands and 1.5 times in the other three directions to form the Region of Interest.

The action-frame detection of step 220 will now be explained with reference to FIGS. 4A, 4B, and FIGS. 5A-5D.

For surgical stage recognition, two visual elements may be utilized in one embodiment of the present invention. One is the surgical tool, and the other is the appearance of the pupil. Surgical tools appear almost the same in the same stage across different cataract surgery videos. However, the appearance of the pupil may vary in different surgery videos, depending on the patient and how each surgeon performs the surgery. Thus, surgical tools are more reliable and should be the main visual cue for stage recognition. Based on the presence of surgical tools, frames in each step can be separated into two types: 1) frames with surgical tools are considered action frames, as shown in FIG. 4A; and 2) frames without surgical tools are downtime frames, as shown in FIG. 4B. The preferred embodiment retains the action frames and discards the downtime frames during stage classification. The non-informative downtime frames, which can only introduce ambiguity in stage classification, will be properly handled later using temporal constraints.

Detecting the presence of surgical tools can be rather difficult because the shape of a typical surgical tool is generally slim and present small areas for detection. Image segmentation is then utilized to extract the regions that may contain surgical tools. A preferred embodiment of the present invention introduces an intuitive way to achieve higher accuracy. Because almost all of the surgical tools among the six stages have linear properties, a linear Hough transform is applied to find linear structures in the Region of Interest as previously defined by a process of the present invention. However, sometimes the Regions of Interest also contain hooks and the boundaries of an eyelid, which also have linear properties, resulting in incorrect detection results. To address this problem, a preferred embodiment of the present invention uses the fact that the surgeon's operations are concentrated on the pupil to increase effectiveness of a process of the present invention. In other words, the surgical tools tend to point to the center of the pupil, but the hooks and the eyelid boundaries tend to be tangential to the pupil. According to that observation, all the linear components whose distance values to the pupil's center are larger than a threshold value are removed, as shown in FIGS. 5A-5D, where the tangential lines indicating the hooks and the eyelid boundaries are successfully filtered out, while the lines indicating the surgical tools are well preserved.

The stage recognition of step 240 will now be explained.

Oliva and Torralba in "Building the gist of a scene: The role of global image features in recognition" (Progress in brain research, vol. 155, pp. 23, 2006) proposed a global holistic image representation called the GIST feature descriptor. Because the GIST descriptor is appropriate to represent structure, and the structure of surgical tools is an important visual cue for stage recognition, the GIST descriptor is used in one preferred embodiment of the present invention. To extract GIST features, first, the ROI of each action frame is partitioned into 4×4 blocks.

Then, 32 Gabor filters with 4 different frequencies and 8 orientations are applied to each block to generate a 512-dimension GIST feature vector from each action frame, forming the input of the classifiers.

Adaboost as described by Freund. Y. and Schapire, R. "A decision-theoretic generalization of on-line learning and an application to boosting." (Computational learning theory. Springer, pp., 23-37) can alleviate overfitting compared with most other learning algorithms in many situations. As some surgical stages are much shorter (but still crucial) than other stages in videos, the amount of these stages training data can be too small, which may cause overfitting. Thus, Adaboost may be used as a classifier in stage recognition.

There are two possible techniques for stage detection: 1) using a multi-class classifier, and 2) using several one-vs-all binary classifiers. With a multi-class classifier, all stages can be recognized in one classification procedure. It is more convenient than the binary classifiers, each of which only detects one stage at a time. However, the inventors have found that most existing multi-class classifiers perform worse than binary classifiers. To ensure both accuracy and efficiency, binary classifiers and multi-class classifiers are combined together.

First, the six surgical stages are partitioned into two groups, each of which has three temporally consecutive stages. In other words, stage 1 to stage 3 are defined as Group 1, and stage 4 to stage 6 are defined as Group 2. Then, a binary Adaboost classifier is utilized to assign the group label to each frame. Next, for frames labeled with Group 1, the three-class Adaboost classifier is used to obtain stage recognition results, similar to the frames labeled with Group 2. The purpose of applying group recognition prior to stage recognition is to take advantage of the binary classifier's accuracy and the multi-classifier's convenience. That is also supported by two other considerations: 1) the intra-group similarity and inter-group dissimilarity, and 2) balance between the two groups in terms of training data.

Because surgical difficulties vary significantly among the six stages, some stages take much longer time than others in cataract surgery videos. For example, stage 4 (lens removal) is always the most complicated part of cataract surgery and may take over half of the total time of the video. On the other hand, stage 3 (hydrodissection) is less time-consuming than the other stages. Sometimes, the length of stage 3 is not even $\frac{1}{10}$ of that of stage 4. In such a situation, the training data should be balanced to alleviate overfitting.

Figure 6:
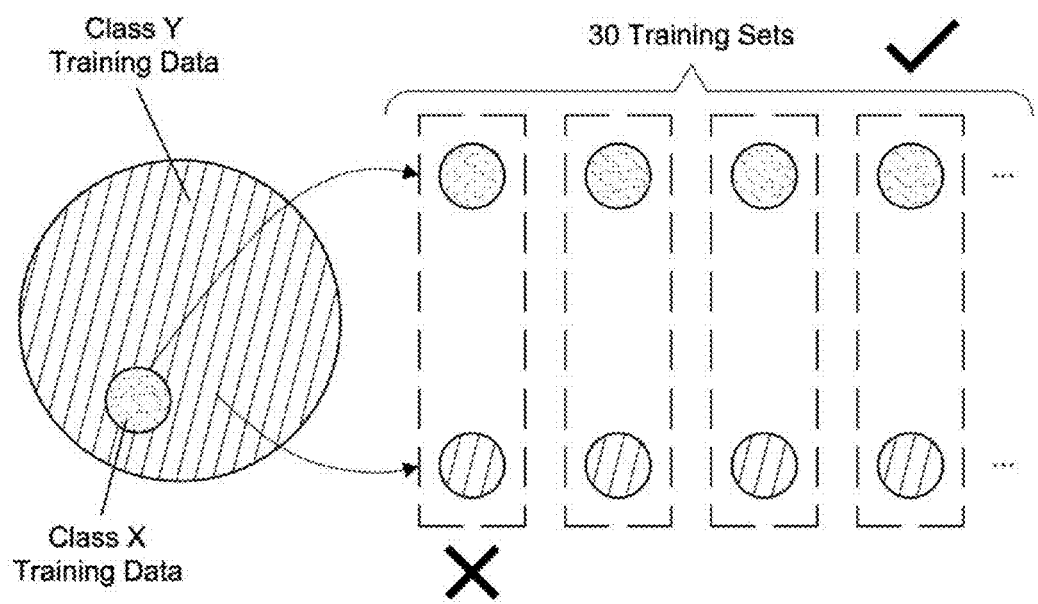
FIG. 6 is a diagram showing a method of bagging for unbalanced training data.

There are generally two ways to deal with unbalanced training data: data replication on the smaller class or down-sampling the larger class. The preferred embodiment performs classification via the bagging method, which belongs to the second way. For example, in a binary classifier, when Class X training data is much less than Class Y training data, down-sampling is applied randomly on Class Y training data for 30 times to ensure that Class X data is no less than half of Class Y data. During each round of the bagging process, one label vector will be generated from the classifier. Then, these 30 label vectors are combined together to vote for the output, as shown in FIG. 6. For each frame, only if more than 15 labels indicate Class X, can it be determined as positive. The situation with multi-class classifiers is similar, except that bagging is applied to the training data of more than one class.

The hidden Markov model (HMM) of step 250 will now be explained.

After inner-group stage recognition, the frames have their stage labels tagged. However, the stages assigned are not necessarily temporally consecutive, so therefore the result should be refined. One preferred embodiment of the present invention uses a six-state Hidden Markov Model, as described, for example, in Baum, L. E., and Petrie, T., "Statistical inference for probabilistic functions of finite state Markov chains," The Annals of Mathematical Statistics, vol. 37, no. 6, pp. 1554-1563, 1966, where each state indicates a surgical stage. In the Hidden Markov Model of one preferred embodiment, state $S_i$ can only stay in the same state or transfer to state $S_{i+1}$, with transition probability $p_i$ computed from the training data. Moreover, the emission probabilities of each stage are obtained from the ground truth. Based on the stage recognition results and the HMM structure specified, the most likely sequence of states can be determined.

The present invention can also be effective for analyzing and assessing cataract simulation surgery videos. The simulation surgery is performed on a simulated eye where such simulations are helpful for trainees to become familiar with various surgical procedures.

To grade surgeries, whether the surgeries involve operations on a human eye or a simulated eye, a plurality of measurements are computed from the frames of the stages separated by the timing that has been determined using the early steps of one embodiment of the present invention described herein. These measurements include 1) the time taken to complete the surgical step, 2) the centrality of the eye during a surgical step, and 3) the shape and size of the opening during capsulorrhexis, and other suitable measurements that can be computed from the video frames. These plurality of measurements are then used to assign a numeric grade to the performance of the surgeon.

The various embodiments described above are provided by way of illustration only and should not be construed to limit the invention. For example, other similar surgical settings where the present invention is applicable, with proper adjustment, include the nose and the knee. Both human and veterinary uses are included in the present invention and the various embodiments described and envisioned herein. Furthermore, recitations of specific computational techniques are illustrative rather than limiting; equivalent techniques can be used instead of, or in addition to, those disclosed. Those skilled in the art who have reviewed the present disclosure will readily recognize various modifications and changes that may be made to the present invention without following the example embodiments and applications illustrated and described herein, and without departing from the true spirit and scope of the present invention, which is set forth in this specification, drawings, and claims.

It is, therefore, apparent that there has been provided, in accordance with the various objects of the present invention, a Method System For Recognizing and Assessing Surgical Procedures From Video.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and drawings provided herein.

What is claimed is:

1. A computer-based method for recognizing and assessing surgical procedures captured on a digital video having a plurality of frames, the method comprising the steps of:
   providing surgical procedure video data on a computer having a processor, memory and computer readable media and storing said input video data on the computer readable media;
   locating in the surgical procedure video data on the computer an anatomic structure of a surgical procedure;
   determining in the surgical procedure video data on the computer timing of predefined surgical stages;
   determining on the computer a plurality of measurements from frames of the predefined surgical stages separated by the timing;
   determining the timing by using a classifier;
   identifying on the computer action frames where the surgeon is performing actions on the anatomic structure;
   identifying on the computer downtime frames in which the surgeon is not performing actions on the anatomic structure;
   retaining on the computer the action frames while discarding the downtime frames; and
   assessing performance of a surgeon responsible for the surgical procedure according to the determined measurements.

2. The method of claim 1, further comprising the step of detecting on the computer surgical tools in the digital video.

3. The method of claim 2, wherein the surgical tools are detected by detecting objects having linear properties.

4. The method of claim 1, wherein the classifier is selected from the group consisting of a multi-class classifier, a binary classifier, and a multi-class classifier in combination with a binary classifier.

5. The method of claim 1, wherein the stages are grouped into groups.

6. The method of claim 1, further comprising the step of applying temporal smoothing to the surgical video data.

7. The method of claim 6, wherein the temporal smoothing is achieved using a Hidden Markov Model (HMM).

8. The method of claim 1, further comprising the step of providing user feedback based on the determined measurements.

9. The method of claim 8, wherein the user feedback is selected from the group consisting of visual feedback and audible feedback.

10. A computer-based system for recognizing and assessing surgical procedures captured on a digital video having a plurality of frames, the system comprising:
    a computer having a processor, memory, and access to computer readable media;
    the computer configured to receive surgical procedure video data and output surgical performance assessment measurements;
    a computer program stored on computer readable media where the computer program executes the steps of:
    locating in the surgical procedure video data on the computer an anatomic structure of a surgical procedure;
    determining in the surgical procedure video data on the computer timing of predefined surgical stages;
    determining on the computer a plurality of measurements from frames of the predefined surgical stages separated by the timing;
    determining the timing by using a classifier;
    identifying on the computer action frames where the surgeon is performing actions on the anatomic structure;

identifying on the computer downtime frames in which the surgeon is not performing actions on the anatomic structure;

retaining on the computer the action frames while discarding the downtime frames; and providing performance assessment measurements on a computer screen.

11. The computer-based system of claim 10, wherein the computer program further comprises the step of detecting on the computer surgical tools in the digital video.

12. The computer-based system of claim 11, wherein the surgical tools are detected by detecting objects having linear properties.

13. The computer-based system of claim 10, wherein the classifier is selected from the group consisting of a multi-class classifier, a binary classifier, and a multi-class classifier in combination with a binary classifier.

14. The computer-based system of claim 10, wherein the stages are grouped into groups.

15. The computer-based system claim 10, wherein the computer program further comprises the step of applying on the computer temporal smoothing to the surgical video data.

16. The computer-based system of claim 15, wherein the temporal smoothing is achieved using a Hidden Markov Model (HMM).

17. The computer-based system of claim 10, wherein the computer program further comprises the step of providing user feedback based on the determined measurements.

18. The computer-based system of claim 17, wherein the user feedback is selected from the group consisting of visual feedback and audible feedback.

* * * * *